United States Patent
Chi et al.

(10) Patent No.: US 12,537,635 B2
(45) Date of Patent: Jan. 27, 2026

(54) WIRELESS COMMUNICATION DEVICE AND MOVING METHOD THEREOF

(71) Applicant: BENQ CORPORATION, Taipei (TW)

(72) Inventors: Chin Jui Chi, Taipei (TW); Po-Ching Kang, Taipei (TW); Pei Wen Huang, Taipei (TW)

(73) Assignees: BenQ Intelligent Technology (Shanghai) CO., LTD, Shanghai (CN); BenQ Corporation, Taipei (TW)

( * ) Notice: Subject to any disclaimer, the term of this patent is extended or adjusted under 35 U.S.C. 154(b) by 447 days.

(21) Appl. No.: 18/170,543

(22) Filed: Feb. 17, 2023

(65) Prior Publication Data

US 2024/0163035 A1 May 16, 2024

(30) Foreign Application Priority Data

Nov. 14, 2022 (TW) .................................. 111143446

(51) Int. Cl.
| | |
|---|---|
| H04L 5/00 | (2006.01) |
| H04W 64/00 | (2009.01) |
| H04W 72/0446 | (2023.01) |

(52) U.S. Cl.
CPC ......... *H04L 5/0023* (2013.01); *H04W 64/003* (2013.01); *H04W 72/0446* (2013.01)

(58) Field of Classification Search
CPC .............. H04L 5/0023; H04W 64/003; H04W 72/0446; H04W 24/02
See application file for complete search history.

(56) References Cited

U.S. PATENT DOCUMENTS

| | | | |
|---|---|---|---|
| 8,195,240 B2* | 6/2012 | Jin ........................ | H04W 16/28 455/562.1 |
| 8,363,603 B2* | 1/2013 | Dong .................... | H04W 16/04 370/310 |

(Continued)

FOREIGN PATENT DOCUMENTS

| | | |
|---|---|---|
| CN | 105472538 | 4/2016 |
| CN | 206675478 | 11/2017 |

(Continued)

OTHER PUBLICATIONS

"Office Action of Taiwan Counterpart Application", issued on Apr. 25, 2023, p. 1-p. 13.

*Primary Examiner* — Kabir A Timory (57) ABSTRACT

A wireless communication device and a moving method thereof are provided. The moving method is adapted for the wireless communication device moving in a zone. While moving in the zone, a wireless signal status of a signal source device is measured. The zone is divided into multiple sub-blocks, and a spatial weight parameter corresponding to each of the sub-blocks is determined according to the wireless signal state of the signal source device. In response to a user equipment being connected to the wireless communication device, a preferred sub-block is selected from the sub-blocks according to user context information of the user equipment and the spatial weight parameter corresponding to each of the sub-blocks. The wireless communication device moves into the preferred sub-block to perform wireless communication with the signal source device and the user equipment within the preferred sub-block.

20 Claims, 8 Drawing Sheets

(56) References Cited

U.S. PATENT DOCUMENTS

| | | | |
|---|---|---|---|
| 10,225,685 B2 | 3/2019 | Lin et al. | |
| 2012/0309428 A1 | 12/2012 | Marti et al. | |
| 2014/0248899 A1* | 9/2014 | Emadzadeh | H04W 4/029 |
| | | | 455/456.1 |
| 2016/0202342 A1 | 7/2016 | Collins et al. | |
| 2016/0316321 A1* | 10/2016 | Lin | H04W 4/029 |

FOREIGN PATENT DOCUMENTS

| | | |
|---|---|---|
| CN | 109787842 | 5/2019 |
| CN | 107483096 | 7/2020 |
| CN | 216625732 | 5/2022 |

* cited by examiner

WIRELESS COMMUNICATION DEVICE AND MOVING METHOD THEREOF

CROSS-REFERENCE TO RELATED APPLICATION

This application claims the priority benefit of Taiwan application serial no. 111143446, filed on Nov. 14, 2022. The entirety of the above-mentioned patent application is hereby incorporated by reference herein and made a part of this specification.

BACKGROUND

Technical Field

The disclosure relates to a wireless communication technology, and more particularly, to a wireless communication device and a moving method thereof.

Description of Related Art

With the advancement of the network communication technology, connecting to the Internet through a wireless local area network has become a very common behavior in the daily life of modern people. A user equipment with a network connection function may be connected to wireless access points in the wireless local area network, so that the user equipment may perform different network application functions such as calling, video conferencing, browsing the web, playing online games, or watching videos through the network. Generally speaking, a service coverage of the wireless access points in the wireless local area network is limited, and the wireless access points in the wireless local area network are actually deployed in fixed positions. Therefore, once the user equipment leaves the service coverage of the wireless access points, it may not be connected to the Internet through the wireless access points. In addition, when a wireless signal emitted by the wireless access points is seriously blocked by obstacles, the quality of network connection of the user equipment will be greatly degraded. Although deploying the wireless access points or signal relay devices in the space may extend the service coverage of the wireless local area network and avoid communication dead zones as far as possible, it relatively increases chances of handover of the user equipment, and may cause an increase in communication latency.

SUMMARY

In light of the above, the disclosure proposes a wireless communication device and a moving method thereof, which may solve the above technical issues.

According to an embodiment of the disclosure, a moving method adapted for a wireless communication device moving in a zone is provided and includes the following. While moving in the zone, a wireless signal status of a signal source device is measured. The zone is divided into multiple sub-blocks, and a spatial weight parameter corresponding to each of the sub-blocks is determined according to the wireless signal state of the signal source device. In response to a user equipment being connected to the wireless communication device, a preferred sub-block is selected from the sub-blocks according to user context information of the user equipment and the spatial weight parameter corresponding to each of the sub-blocks. The wireless communication device moves into the preferred sub-block to perform wireless communication with the signal source device and the user equipment within the preferred sub-block.

According to an embodiment of the disclosure, a wireless communication device including a moving device, a wireless transceiver, and a processor is provided. The processor is coupled to the moving device and the wireless transceiver, and is configured to perform the following. While moving in a zone through the moving device, a wireless signal status of a signal source device is measured. The zone is divided into multiple sub-blocks, and a spatial weight parameter corresponding to each of the sub-blocks is determined according to the wireless signal state of the signal source device. In response to a user equipment being connected to the wireless communication device, a preferred sub-block is selected from the sub-blocks according to user context information of the user equipment and the spatial weight parameter corresponding to each of the sub-blocks. The processor moves into the preferred sub-block through the moving device to perform wireless communication with the signal source device and the user equipment within the preferred sub-block through the wireless transceiver.

Based on the above, in the embodiment of the disclosure, the wireless communication device may perform scanning measurement on the wireless signal status of the signal source device while moving in the specific zone. Afterwards, the wireless communication device may divide the zone into the sub-blocks according to the wireless signal states measured at different positions, and determine the spatial weight parameter corresponding to each of the sub-blocks based on the wireless signal state of the signal source device. When the user equipment is connected to the wireless communication device, the preferred sub-block may be selected according to the spatial weight parameter of each of the sub-blocks and the user context information, and the wireless communication device automatically moves to the preferred sub-block and serves as a wireless relay device between the signal source device and the user equipment. In this way, the probability of access point handover by the user equipment may be reduced, and the communication latency may be reduced, thereby effectively improving the network connection quality.

DETAILED DESCRIPTION OF DISCLOSED EMBODIMENTS

Some embodiments of the disclosure accompanied with the drawings will now be described in detail. For the reference numerals recited in description below, the same reference numerals shown in different drawings will be regarded as the same or similar elements. These embodiments are only a part of the disclosure, and do not disclose all the possible implementations of the disclosure. To be more precise, these embodiments are only examples of methods and devices in the appended claims of the disclosure.

Figure 1:
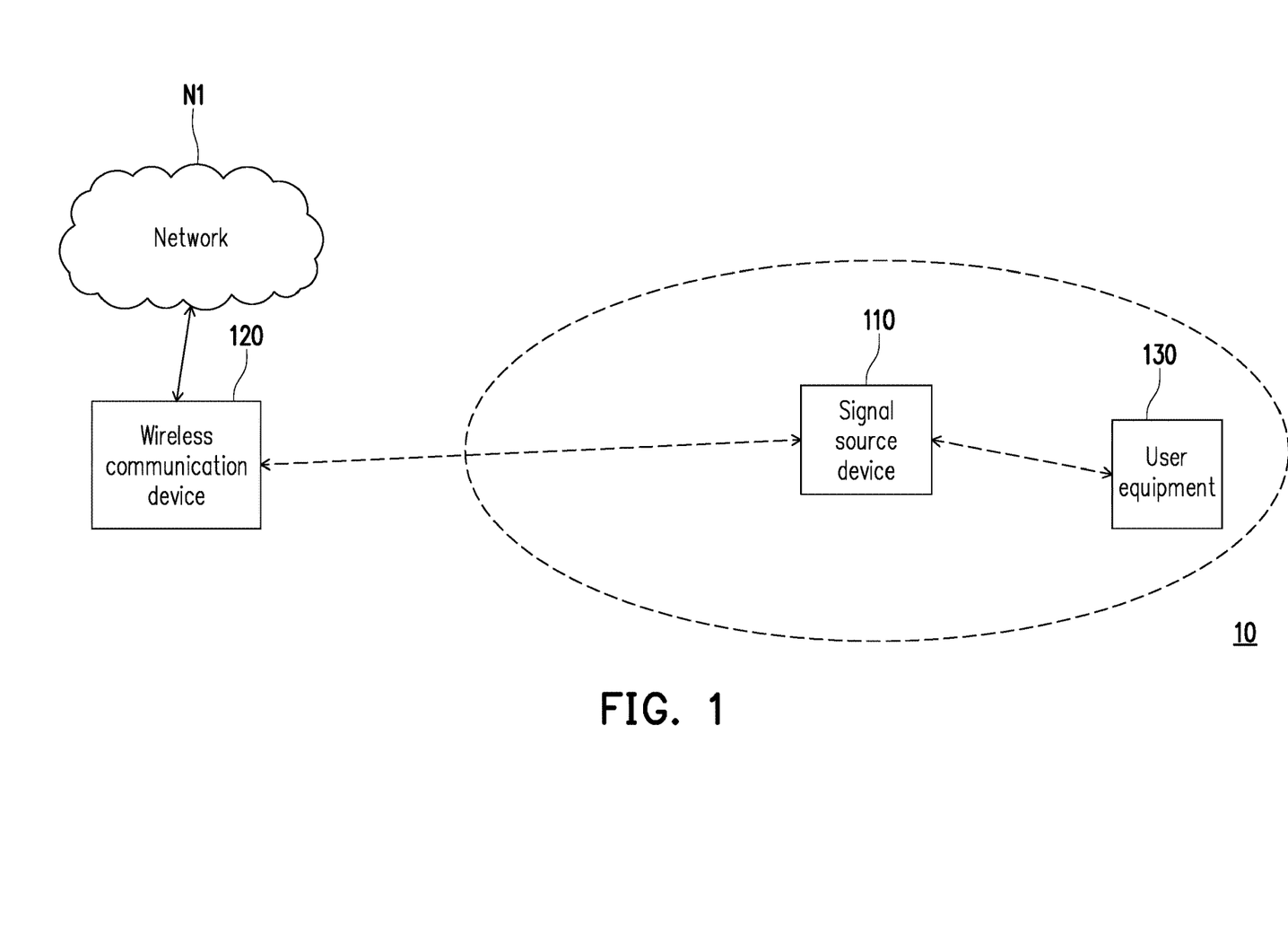
FIG. 1 is a schematic view of a wireless communication system according to an embodiment of the disclosure.

Referring to FIG. 1, FIG. 1 is a schematic view of a wireless communication system according to an embodiment of the disclosure. A wireless communication system 10 includes a wireless communication device 110, a signal source device 120, and a user equipment 130.

In some embodiments, the signal source device 120 may be a wireless access point with a wireless communication function. The signal source device 120 may communicate with other equipments in a WLAN network by using a wireless local area network (WLAN) standard. The WLAN standard is, for example, a WiFi standard, but the disclosure is not limited thereto. In addition, the signal source device 120 may be connected to a network N1. For example, the signal source device 120 may be connected to the network N1 through a modem of an Internet service provider (ISP). In some embodiments, the signal source device 120 may be a modem with a built-in wireless communication function. In addition, in some embodiments, the signal source device 120 and the modem may be two separate devices. From another point of view, the signal source device 120 is, for example, a router or a switch using the WLAN standard and having the wireless communication function. In addition, in some embodiments, the signal source device 120 may be a base station using a mobile communication standard (such as a 4G standard or 5G standard).

The user equipment 130 may be a wireless terminal device with the wireless communication function, for example, mobile electronic devices such as a notebook computer, a tablet computer, a mobile phone, a smart wearable device, and a game console, but the disclosure is not limited thereto. In the embodiment of the disclosure, the user equipment 130 may be connected to the network N1 through the signal source device 120 to transmit and receive data. However, when the user equipment 130 is not in a coverage of the signal source device 120, the user equipment 130 may not be directly connected to the signal source device 120.

The wireless communication device 110 is a wireless access point with the wireless communication function, and may perform wireless communication with the signal source device 120 and the user equipment 130 at the same time. More specifically, in some embodiments, the wireless communication device 110 may be a wireless relay device supporting the WLAN standard, and perform the wireless communication with the signal source device 120 and the user equipment 130 based on the WLAN standard. The wireless communication device 110 may perform the wireless communication with the signal source device 120 and the user equipment 130 by using a frequency band of 2.4 GHz or 5 GHz. On this basis, when the user equipment 130 is not in the coverage of the signal source device 120 or is not in a coverage of a preferred signal provided by the signal source device 120, the user equipment 130 may be connected to the network N1 through a connection between the wireless communication device 110 and the signal source device 120, so as to transmit and receive the data through the network N1. In addition, in some embodiments, the wireless communication device 110 may also support both the mobile communication standard and the WLAN standard, and perform the wireless communication with the signal source device 120 based on the mobile communication standard and perform the wireless communication with the user equipment 130 based on the WLAN standard. It should be noted that, in the embodiment of the disclosure, the wireless communication device 110 has mobility. Therefore, a service coverage of the wireless communication device 110 may change as the wireless communication device 110 moves.

Figure 2:
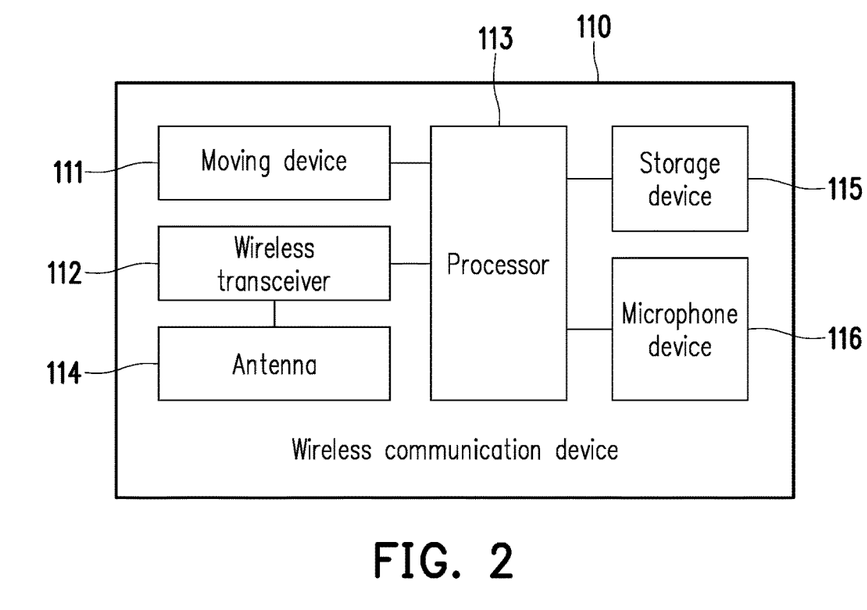
FIG. 2 is a schematic view of a wireless communication device according to an embodiment of the disclosure.

Referring to FIG. 2, FIG. 2 is a schematic view of a wireless communication device according to an embodiment of the disclosure. The wireless communication device 110 includes a moving device 111, a wireless transceiver 112, a processor 113, an antenna 114, a storage device 115, and a microphone device 116.

The moving device 111 has mobility, so that the wireless communication device 110 may move on a ground by itself. In some embodiments, the moving device 111 is an electro-mechanical device with rollers, and electric power may drive a motor to drive the rollers to rotate, so that the moving device 111 may move on the ground by itself through rotation of the rollers.

The wireless transceiver 112 may transmit and receive a wireless radio frequency signal in a wireless manner. The wireless transceiver 112 may perform operations such as low-noise amplification, impedance matching, frequency mixing, up-down frequency conversion, filtering, amplification, and/or the like. The wireless transceiver 112 is connected to the antenna 114 to transmit and receive the radio frequency signal through the antenna 114. The antenna 114 may include one or more antenna units configured to transmit and receive omnidirectional antenna beams or directional antenna beams.

The storage device 115 may be configured to record multiple instructions, program codes, or software modules. Specifically, the storage device 115 is configured to store the data and the instructions accessed by the processor 113, which may be, for example, any type of fixed or removable random access memory (RAM), read-only memory (ROM), flash memory, hard disk, or a combination thereof.

The processor 113 is, for example, a central processing unit (CPU), other programmable general-purpose or special-purpose micro control units (MCUs), a microprocessor, a digital signal processor (DSP), a programmable controller, an application specific integrated circuit (ASIC), a complex programmable logic device (CPLD), a field programmable gate array (FPGA), other similar elements, or a combination of the above elements. In the embodiment of the disclosure, the processor 113 may access the instructions, software modules, and program codes recorded in the storage device 115 to implement a moving method provided in the disclosure, and details thereof will be described in subsequent embodiments.

The microphone device 116 may receive a voice signal emitted by a user or the user equipment 130. Furthermore, in some embodiments, the microphone device 116 may include a microphone array formed by multiple microphone units. On this basis, by applying a sound source localization technology of the microphone array, a position of the user or the user equipment 130 that issues a voice command may be precisely located. Furthermore, the microphone device 116 may also be set to receive a voice signal of a specific frequency, and the user equipment 130 emits a corresponding voice signal of a specific frequency, which may prevent the microphone device 116 from receiving other sound noises, thereby achieving a more accurate localization effect.

Figure 3:
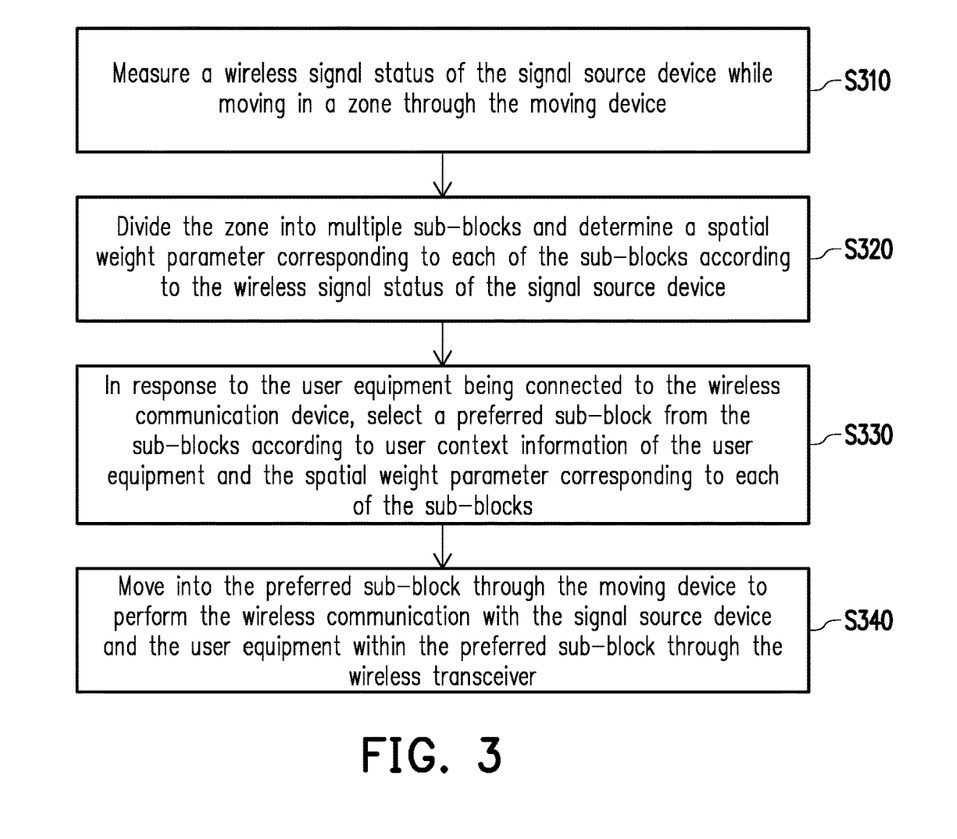
FIG. 3 is a flowchart of a moving method of a wireless communication device according to an embodiment of the disclosure.
Figure 4:
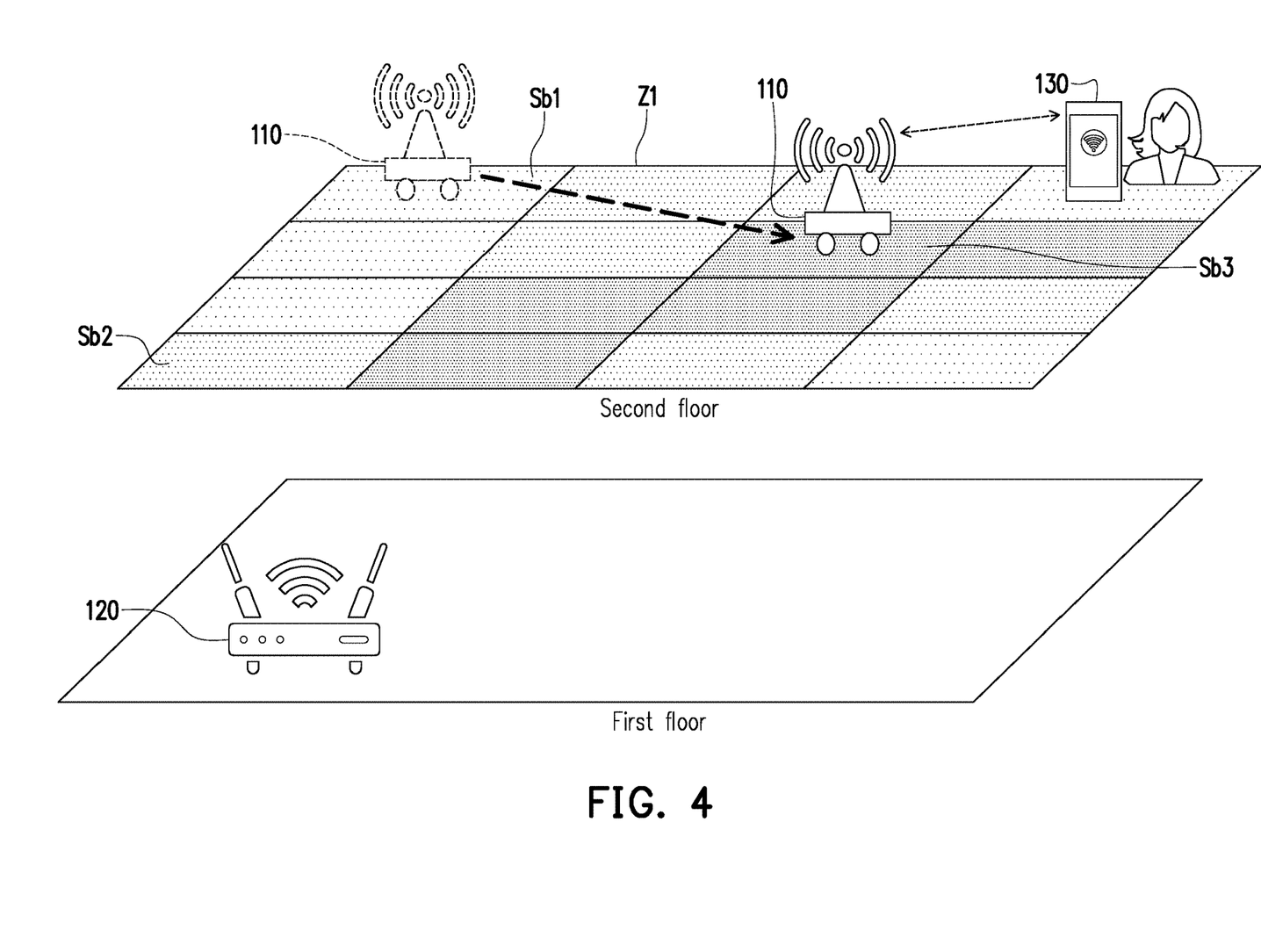
FIG. 4 is a schematic view of a context according to an embodiment of the disclosure.

FIG. 3 is a flowchart of a moving method according to an embodiment of the disclosure, and a flow process of the method in FIG. 3 may be implemented by elements of the wireless communication device 110 in FIGS. 1 and 2. In addition, FIG. 4 is a schematic view of a context according to an embodiment of the disclosure. Hereinafter, steps of the moving method in this embodiment will be described with the elements shown in FIGS. 1, 2, and the context in FIG. 4.

In step S310, while moving in a zone Z1 through the moving device 111, the processor 113 measures a wireless signal status of the signal source device 120. Specifically, the wireless communication device 110 may move to different positions in the zone Z1 along a scan path through the moving device 111, and measure the wireless signal status of the signal source device 120 at the positions respectively. In some embodiments, the wireless communication device 110 may be an autonomous moving device with a map scanning function. The processor 113 may establish a map of the zone Z1 through a map scanning function and various spatial sensing technologies (such as the lidar sensing technology, infrared sensing technology, or image sensing technology), and measure the wireless signal status of the signal source device 120 at different positions on the map. In some embodiments, the wireless signal state measured by the processor 113 includes at least one of signal intensity, a signal-to-noise ratio, and a bit error rate.

In step S320, the processor 113 may divide the zone Z1 into multiple sub-blocks and determine a spatial weight parameter corresponding to each of the sub-blocks according to the wireless signal status of the signal source device 120. Specifically, after moving to the different positions in the zone Z1 along the scan path, the processor 113 may collect the wireless signal states corresponding to the different positions in the zone Z1 respectively. Therefore, according to a division principle that the measured wireless signal states in the same sub-block are substantially similar, the processor 113 may divide the zone Z1 into the sub-blocks according to the measured wireless signal states at the different positions in zone Z1. That is to say, the sub-blocks may include a first sub-block and a second sub-block, and the wireless signal state of the signal source device 120 in the first sub-block is different from the wireless signal state of the signal source device 120 in the second sub-block.

For example, referring to FIG. 4, the processor 113 may divide the zone Z1 into the sub-blocks with similar sizes according to a signal measurement result, which are a sub-block Sb1, a sub-block Sb2, a sub-block Sb3, and other unmarked sub-blocks respectively. For convenience of description, the sub-blocks shown in FIG. 4 are rectangles as an example, but the disclosure is not limited thereto. An actual shape of the sub-block depends on the wireless signal status of the signal source device 120 and the obstacles in the zone Z1. In addition, an upper limit and a lower limit of the sizes of the sub-blocks may be set according to actual applications, and the disclosure is not limited thereto.

Here, the wireless signal status of the signal source device 120 is taken as the signal intensity as an example for illustration. In the example shown in FIG. 4, the denser the dot density of the sub-blocks, the higher the signal intensity. Conversely, the sparser the dot density of the sub-block, the lower the signal intensity. For example, the signal intensity measured by the wireless communication device 110 located in the sub-block Sb1 is within a first signal intensity range. The signal intensity measured by the wireless communication device 110 located in the sub-block Sb2 is within a second signal intensity range. The signal intensity measured by the wireless communication device 110 located in the sub-block Sb3 is within a third signal intensity range. Under this condition, the spatial weight parameter corresponding to the sub-block Sb1 may be preset as a first weight value. The spatial weight parameter corresponding to the sub-block Sb2 may be preset as a second weight value. The spatial weight parameter corresponding to the sub-block Sb3 may be preset as a third weight value. The first weight value, the second weight value, and the third weight value are different from one another.

For example, Table 1 is an example of the respective spatial weight parameters of the five sub-blocks.

TABLE 1

| | Wireless signal state | Spatial weight parameter |
| --- | --- | --- |
| Sub-block #1 | The signal intensity is within the first signal intensity range. | $W_{ss1}$ |
| Sub-block #2 | The signal intensity is within the second signal intensity range. | $W_{ss2}$ |
| Sub-block #3 | The signal intensity is within the first signal intensity range. | $W_{ss3}$ |
| Sub-block #4 | The signal intensity is within the third signal intensity range. | $W_{ss4}$ |
| Sub-block #5 | The signal intensity is within the first signal intensity range. | $W_{ss5}$ |

In addition, in some embodiments, the processor 130 may periodically or irregularly re-measure the wireless signal status of the signal source device 120, so as to update a division method of the sub-blocks and the corresponding spatial weight parameters.

In step S330, in response to the user equipment 130 being connected to the wireless communication device 110, the processor 113 selects a preferred sub-block from the sub-blocks according to user context information of the user equipment 130 and the spatial weight parameter corresponding to each of the sub-blocks. That is to say, in addition to referring to the wireless signal state between the signal source device 120 and the wireless communication device 110, the processor 113 further refers to the user context information of the user equipment 130 to select the preferred sub-block from the sub-blocks.

In some embodiments, the user context information may include the position of the user equipment 130, executed applications, network traffic, transmission reliability, a minimum dependable flow rate, a maximum attainable flow rate, or a combination thereof. The network traffic is real-time network traffic of the user equipment 130. The minimum dependable flow rate and the maximum attainable flow rate depend on communication capabilities of communication elements of the user equipment 130. The transmission reliability depends on wireless connection quality between the user equipment 130 and the wireless communication device 110, and the wireless connection quality between the user equipment 130 and the wireless communication device 110 may include the signal intensity, the signal-to-noise ratio, the bit error rate, etc. measured by the user equipment 130. That is to say, in some embodiments, the processor 113 may analyze the network traffic and/or the wireless connection quality of the user equipment 130, so as to select the preferred subblock according to an analysis result of the network traffic and/or the wireless connection quality of the user equipment 130. In addition, in some embodiments, the processor 113 may select the preferred sub-block according to the position of the user equipment 130 or the application executed by the user equipment 130.

In step S340, the processor 113 moves into the preferred sub-block through the moving device 111, and performs the wireless communication with the signal source device 120 and the user equipment 130 within the preferred sub-block through the wireless transceiver 112. As shown in FIG. 4, after the preferred sub-block is determined to be the sub-block Sb3, the wireless communication device 110 moves to the sub-block Sb3 through the moving device 111. In some embodiments, in addition to moving into the preferred sub-block, the wireless communication device 110 may further determine which position in the preferred sub-block to move to according to some specific rules. For example, the specific rule may include moving to an edge of the zone Z1 as much as possible, places other than a doorway or a center of an aisle, etc., so as to avoid the wireless communication device 110 from obstructing a travelling route. Next, the wireless communication device 110 located in the sub-block Sb3 may serve as the wireless relay device between the signal source device 120 and the user equipment 130. In other words, the wireless communication device 110 located in the sub-block Sb3 may transmit a packet sent by the user equipment 130 to the signal source device 120, so that the signal source device 120 may send the packet to the network N1. In addition, the signal source device 120 may transmit the packet from the network N1 to the wireless communication device 110 located in the sub-block Sb3, so that the wireless communication device 110 may transmit the packet to the user equipment 130.

Therefore, based on movability of the wireless communication device 110, in the embodiment of the disclosure, the probability of access point handover by the user equipment 130 may be reduced. Moreover, based on the movability of the wireless communication device 110, in the embodiment of the disclosure, an increase in communication latency due to bridging multiple relay devices may be avoided. In addition, since the preferred sub-block is selected according to the wireless signal status of each of the sub-blocks and the user context information of the user equipment 130, it may provide good network connection quality that meets requirements of the user in response to various use contexts.

Figure 5:
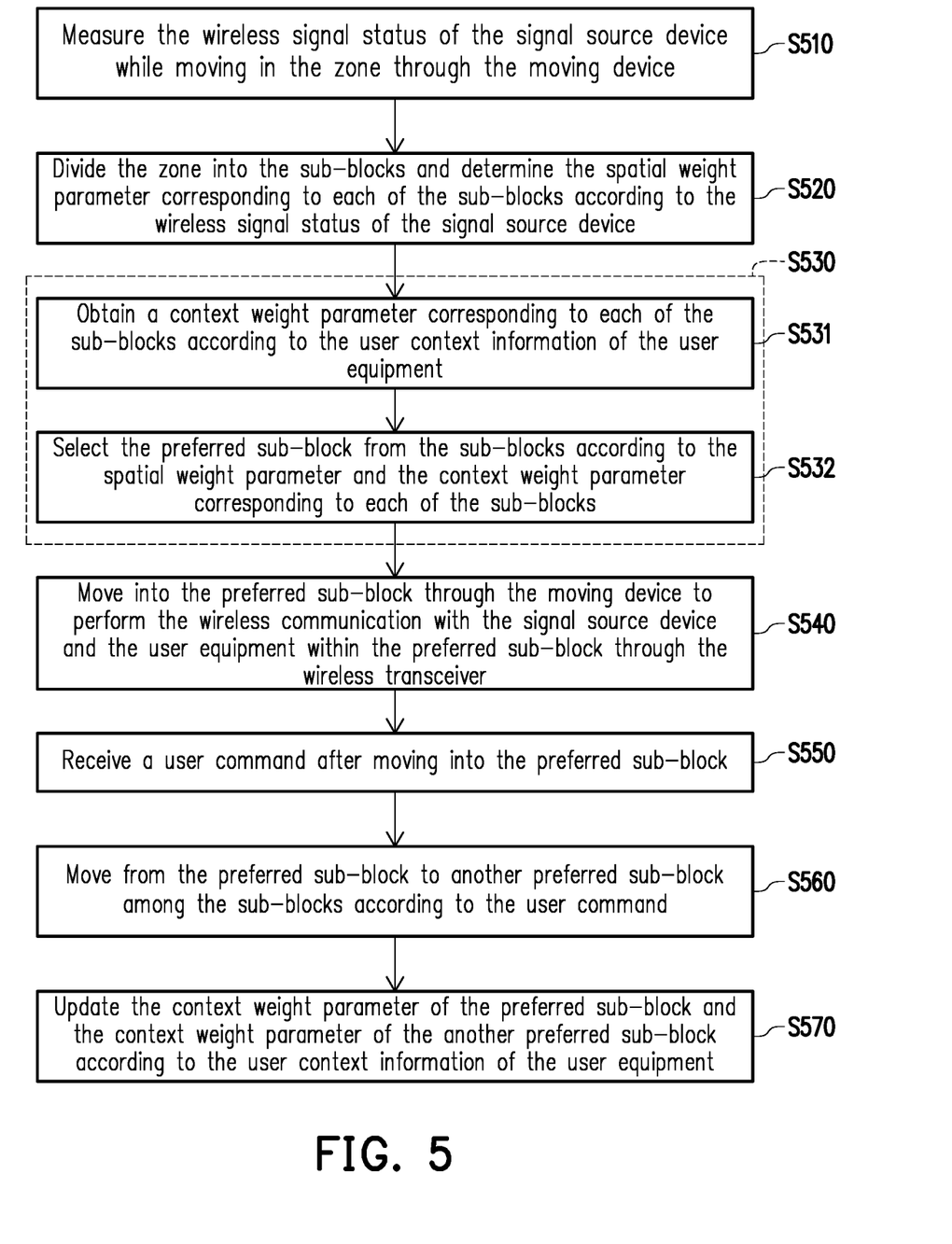
FIG. 5 is a flowchart of a moving method of a wireless communication device according to an embodiment of the disclosure.

Referring to FIG. 5, FIG. 5 is a flowchart of a moving method of a wireless communication device according to an embodiment of the disclosure. A flow process of the method in FIG. 5 may be implemented by the elements of the wireless communication device 110 in FIGS. 1 and 2. Hereinafter, steps of the moving method in this embodiment will be described with the elements shown in FIGS. 1 and 2.

In step S510, the processor 113 measures the wireless signal status of the signal source device 120 while moving in the zone through the moving device 111. In step S520, the processor 113 divides the zone into the sub-blocks and determines the spatial weight parameter corresponding to each of the sub-blocks according to the wireless signal status of the signal source device 120. Detailed implementations of step S510 to step S520 have been described in the foregoing embodiments, and thus the same details will not be repeated in the following.

In step S530, in response to the user equipment 130 being connected to the wireless communication device 110, the processor 113 selects the preferred sub-block from the sub-blocks according to the user context information of the user equipment 130 and the spatial weight parameter corresponding to each of the sub-blocks. In this embodiment, step S530 may be implemented as step S531 and step S532.

In step S531, the processor 113 obtains a context weight parameter corresponding to each of the sub-blocks according to the user context information of the user equipment 130. In some embodiments, when the user context information meets a first context condition, each of the sub-blocks corresponds to a first context weight parameter. In some embodiments, when the user context information meets a second context condition, each of the sub-blocks corresponds to a second context weight parameter. That is to say, according to different user context information, the processor 113 uses different context weight parameters to determine the preferred sub-block.

Figure 6:
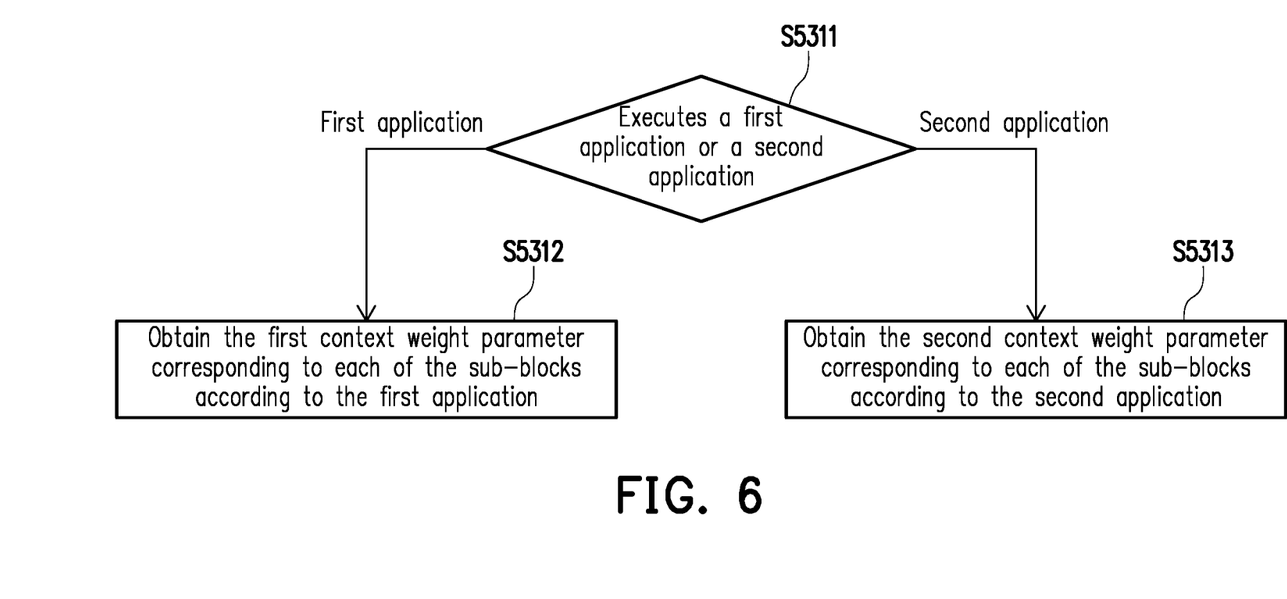
FIG. 6 is a flowchart of obtaining a context weight parameter according to an embodiment of the disclosure.

Referring to FIG. 6, FIG. 6 is a flowchart of obtaining a context weight parameter according to an embodiment of the disclosure. In this embodiment, the user context information is an application executed by the user equipment 130. In step S5311, the processor 113 determines whether the user equipment 130 executes a first application or a second application. When the user equipment 130 executes the first application, the processor 113 obtains the first context weight parameter corresponding to each of the sub-blocks according to the first application. On the other hand, when the user equipment 130 executes the second application, the processor 113 obtains the second context weight parameter corresponding to each of the sub-blocks according to the second application. For example, Table 2 is an example of the respective context weight parameters of each of the five sub-blocks.

TABLE 2

|  | The first context weight parameter corresponding to the first application | The second context weight parameter corresponding to the second application |
| --- | --- | --- |
| Sub-block #1 | $W_{APP1\_1}$ | $W_{APP2\_1}$ |
| Sub-block #2 | $W_{APP1\_2}$ | $W_{APP2\_2}$ |
| Sub-block #3 | $W_{APP1\_3}$ | $W_{APP2\_3}$ |
| Sub-block #4 | $W_{APP1\_4}$ | $W_{APP2\_4}$ |
| Sub-block #5 | $W_{APP1\_5}$ | $W_{APP2\_5}$ |

In light of the above, in response to the user equipment 130 switching from executing the first application to executing the second application, the preferred sub-block may change. In response to the change of the preferred sub-block, the wireless communication device 110 automatically adjusts the position through the moving device 111.

Optionally, in some embodiments, when the user context information is the network traffic of the user equipment 130, the processor 113 may obtain the corresponding context weight parameter according to the network traffic of the user equipment 130. The processor 113 determines whether the network traffic of the user equipment 130 is less than a threshold. When the network traffic of the user equipment 130 is less than the threshold, the processor 113 obtains the first context weight parameter corresponding to each of the sub-blocks. On the other hand, when the network traffic of the user equipment 130 is not less than the threshold, the processor 113 obtains the second context weight parameter corresponding to each of the sub-blocks. For example, Table 3 is an example of the respective context weight parameters of each of the five sub-blocks.

TABLE 3

|  | The first context weight parameter with the network traffic less than the threshold | The second context weight parameter with the network traffic not less than the threshold |
| --- | --- | --- |
| Sub-block #1 | $W_{trafficL\_1}$ | $W_{trafficH\_1}$ |
| Sub-block #2 | $W_{trafficL\_2}$ | $W_{trafficH\_2}$ |
| Sub-block #3 | $W_{trafficL\_3}$ | $W_{trafficH\_3}$ |
| Sub-block #4 | $W_{trafficL\_4}$ | $W_{trafficH\_4}$ |
| Sub-block #5 | $W_{trafficL\_5}$ | $W_{trafficH\_5}$ |

In step S532, the processor 113 selects the preferred sub-block from the sub-blocks according to the spatial weight parameter and the context weight parameter corresponding to each of the sub-blocks. In some embodiments, the processor 113 may substitute the spatial weight parameter and the context weight parameter into a preset function to obtain a total weight parameter corresponding to each of the sub-blocks, and select the preferred sub-block according to a maximum value of the total weight parameter corresponding to each of the sub-blocks. The preset function is, for example, a linear polynomial function, but the disclosure is not limited thereto.

For example, the processor 113 may directly add the spatial weight parameter and the context weight parameter to obtain the total weight parameter corresponding to each of the sub-blocks, and select the preferred sub-block according to the maximum value of the total weight parameter corresponding to each of the sub-blocks. Taking Table 1 and Table 2 as examples to continue the description, when the user equipment 130 executes the first application, the processor 113 may calculate the total weight parameter corresponding to each of the sub-blocks, as shown in Table 4 below. Afterwards, the processor 113 may select the sub-block corresponding to the maximum total weight parameter as the preferred sub-block.

TABLE 4

|  | Total weight parameter |
| --- | --- |
| Sub-block #1 | $W_{ss1} + W_{APP1\_1}$ |
| Sub-block #2 | $W_{ss2} + W_{APP1\_2}$ |
| Sub-block #3 | $W_{ss3} + W_{APP1\_3}$ |
| Sub-block #4 | $W_{ss4} + W_{APP1\_4}$ |
| Sub-block #5 | $W_{ss5} + W_{APP1\_5}$ |

In step S540, the processor 113 moves into the preferred sub-block through the moving device 111 to perform the wireless communication with the signal source device 120 and the user equipment 130 within the preferred sub-block through the wireless transceiver 112. In light of the above, the preferred sub-block may change as the use context changes or the usage position changes. That is, the wireless communication device 110 may move to different positions in response to the changes in the use context or the usage position, so that the user equipment 130 may obtain the network connection quality that meets actual requirements as much as possible.

In step S550, the processor 113 receives a user command through the microphone device 116 after moving into the preferred sub-block. In different embodiments, the user may issue the user command by speaking a keyword or clapping hands to instruct the wireless communication device 110 to move. More specifically, when the user is not satisfied with the current network connection quality, the user may issue the user command, so that the wireless communication device 110 moves according to the user command.

In step S560, the processor 113 moves from the preferred sub-block to another preferred sub-block among the sub-blocks according to the user command. In some embodiments, the processor 113 may determine the another preferred sub-block according to the spatial weight parameter and/or the context weight parameter corresponding to each of the sub-blocks, and move from the preferred sub-block to the another preferred sub-block through the moving device 111. For example, the processor 113 may select the preferred sub-block according to a second largest value of the total weight parameter corresponding to each of the sub-blocks.

In step S570, the processor 113 updates the context weight parameter of the preferred sub-block and the context weight parameter of the another preferred sub-block according to the user context information of the user equipment 130. Specifically, when the user does not issue the user command to adjust the position of the wireless communication device 110, it means that the network connection quality provided by the wireless communication device 110 in the another preferred sub-block meets the current requirements of the user. Therefore, in an embodiment, the processor 113 may decrease the context weight parameter of the preferred sub-block and increase the context weight parameter of the another preferred sub-block according to the user context information of the user equipment 130. Taking Table 2 as an example, when the user equipment 130 executes the first application, the processor 113 located in the sub-block #1 (i.e., the preferred sub-block) receives the user command and moves to the sub-block #3 (i.e., the another preferred sub-block) through the moving device 111. Afterwards, if the user does not issue the user command to adjust the position of the wireless communication device 110, the processor 113 may decrease the first context weight parameter $W_{APP1\_1}$ corresponding to the sub-block #1, and increase the first context weight parameter $W_{APP1\_3}$ corresponding to the sub-block #3. In light of the above, the context weight parameters in various user contexts may be updated according to user experiences, so that the selection of the preferred sub-block is closer to the requirements of the user.

In addition, in some embodiments, in response to receiving the user command to move from the preferred sub-block to the another preferred sub-block, the processor 113 may also update the spatial weight parameter of the preferred sub-block and the spatial weight parameter of the another preferred sub-block. Taking Table 1 as an example, the processor 113 located in the sub-block #1 (i.e., the preferred sub-block) receives the user command and moves to the sub-block #3 (i.e., the another preferred sub-block) through the moving device 111. Afterwards, if the user does not issue the user command to adjust the position of the wireless communication device 110, the processor 113 may decrease the spatial weight parameter $W_{SS1}$ corresponding to the sub-block #1, and increase the spatial weight parameter $W_{SS2}$ corresponding to the sub-block #3.

Figure 7:
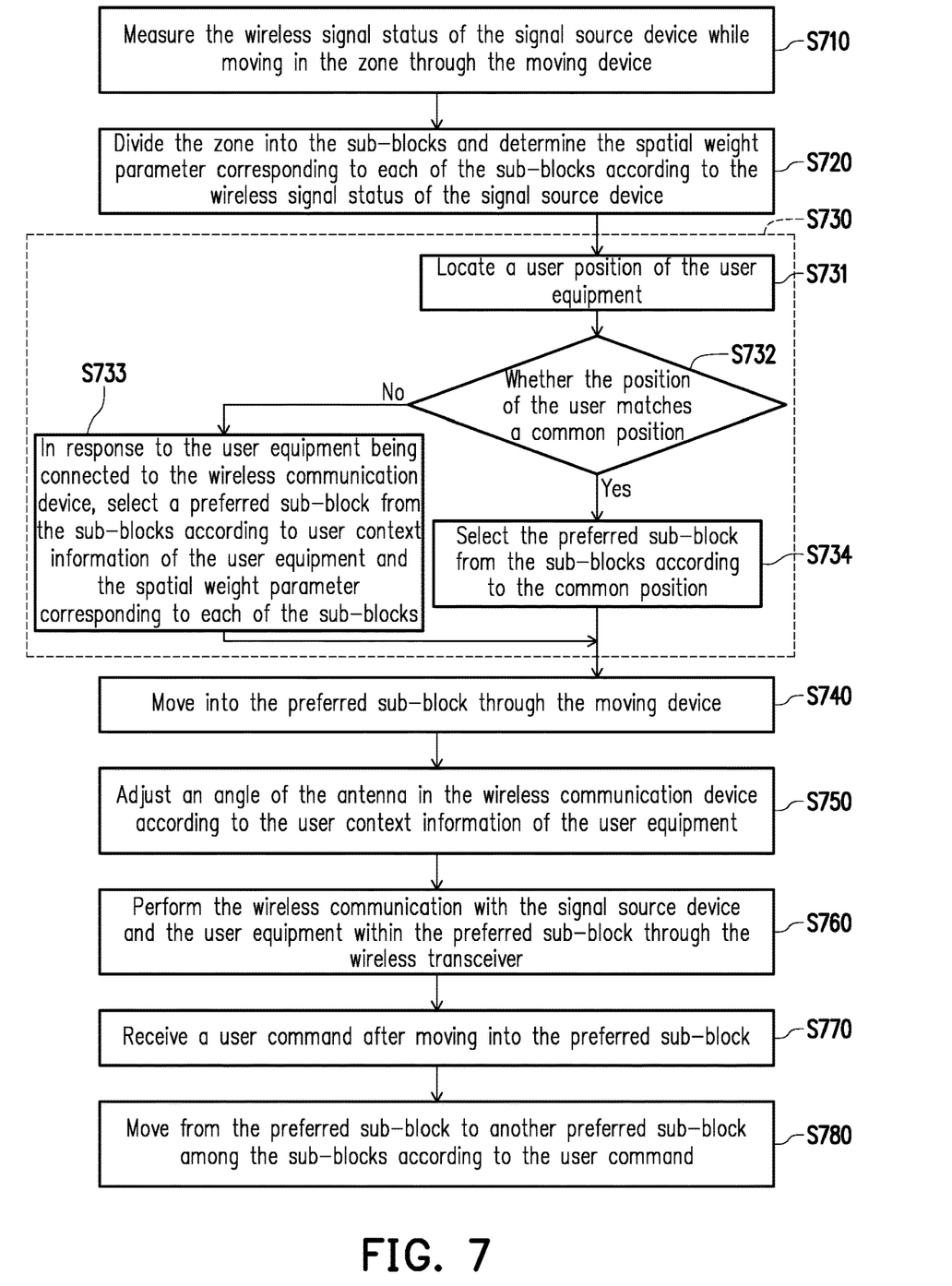
FIG. 7 is a flowchart of a moving method of a wireless communication device according to an embodiment of the disclosure.

Referring to FIG. 7, FIG. 7 is a flowchart of a moving method of a wireless communication device according to an embodiment of the disclosure. A flow process of the method in FIG. 7 may be implemented by the elements of the wireless communication device 110 in FIGS. 1 and 2. Hereinafter, steps of the moving method in this embodiment will be described with the elements shown in FIGS. 1 and 2.

In step S710, while moving in the zone through the moving device 111, the processor 113 measures the wireless signal status of the signal source device 120. In step S720, the processor 113 divides the zone into the sub-blocks and determines the spatial weight parameter corresponding to each of the sub-blocks according to the wireless signal status of the signal source device 120. Detailed implementations of step S710 to step S720 have been described in the foregoing embodiments, and thus the same details will not be repeated in the following.

In step S730, in response to the user equipment 130 being connected to the wireless communication device 110, the processor 113 selects the preferred sub-block from the sub-blocks according to the user context information of the user equipment 130 and the spatial weight parameter corresponding to each of the sub-blocks. In this embodiment, step S730 may be implemented as step S731 to step S734.

In step S731, the processor 113 locates a user position of the user equipment 130 through the microphone device 116. That is to say, the microphone device 116 may receive sound emitted by the user or sound emitted by the user equipment 130 to locate the user position of the user equipment 130 through the microphone units in the microphone array. More specifically, when the processor 113 knows its own position, the processor 113 may obtain the user position of the user equipment 130 according to distance information and direction information detected by the microphone device 116. Furthermore, the microphone device 116 nay also be set to receive the voice signal of the specific frequency, and the user equipment 130 emits the corresponding voice signal of the specific frequency, which may prevent the microphone device 116 from receiving other sound noises, thereby achieving the more accurate localization effect.

In step S732, the processor 113 determines whether the position of the user matches a common position. For example, the user may often use the user equipment 130 to surf the Internet at a desk, on a sofa, or on a bed. Therefore, when the processor 113 determines that the user equipment 130 has appeared at the same position multiple times, it may set this position as the common position. In addition, since the user equipment 130 has appeared at the common position for many times, the storage device 115 may record the same preferred sub-block determined by the user equipment 130 being in the common position each time.

If it is No in step S732, in step S733, the processor 113 selects the preferred sub-block from the sub-blocks according to the user context information of the user equipment 130 and the spatial weight parameter corresponding to each of the sub-blocks. That is to say, in some embodiments, when the processor 113 determines that the position of the user does not match the common position, the processor 113 may determine the preferred sub-block according to the implementation of step S530 in FIG. 5.

If it is Yes in step S732, in step S734, the processor 113 selects the preferred sub-block from the sub-blocks according to the common position. That is to say, whenever the processor 113 determines that the position of the user matches the common position, the processor 113 may directly obtain the preferred sub-block corresponding to the common position without selecting the preferred sub-block according to the spatial weight parameter or the context weight parameter again.

Then, in step S740, the processor 113 moves into the preferred sub-block through the moving device 111. In step S750, the processor 113 adjusts an angle of the antenna 114 in the wireless communication device 110 according to the user context information of the user equipment 130. In some embodiments, the processor 113 may determine whether to adjust the angle of the antenna 114 in the wireless communication device 110 according to the user context information of the user equipment 130. For example, when the network connection quality of the user equipment 130 is not satisfactory, the processor 113 may decide to adjust the angle of the antenna 114 in the wireless communication device 110. In some embodiments, the processor 113 may control the moving device 111 to rotate to change the angle of the antenna 114. In some embodiments, the processor 113 may adjust the angle of the antenna 114 in the wireless communication device 110 according to the position of the user. For example, the processor 113 may determine a rotation angle of the wireless communication device 110 according to the position of the user and a beam direction of the antenna 114, so as to achieve a purpose of adjusting the angle of the antenna 114, so that the beam direction of the antenna 114 may be aligned with the position of the user.

In step S760, the processor 113 performs the wireless communication with the signal source device 120 and the user equipment 130 within the preferred sub-block through the wireless transceiver 112. In step S770, after moving into the preferred sub-block, the processor 113 receives the user command through the microphone device 116. In step S780, the another preferred sub-block among the sub-blocks is moved to from the preferred sub-block according to the user command. Detailed implementations of step S760 to step S780 have been clearly described in the foregoing embodiments, and thus the same details will not be repeated in the following.

Figure 8:
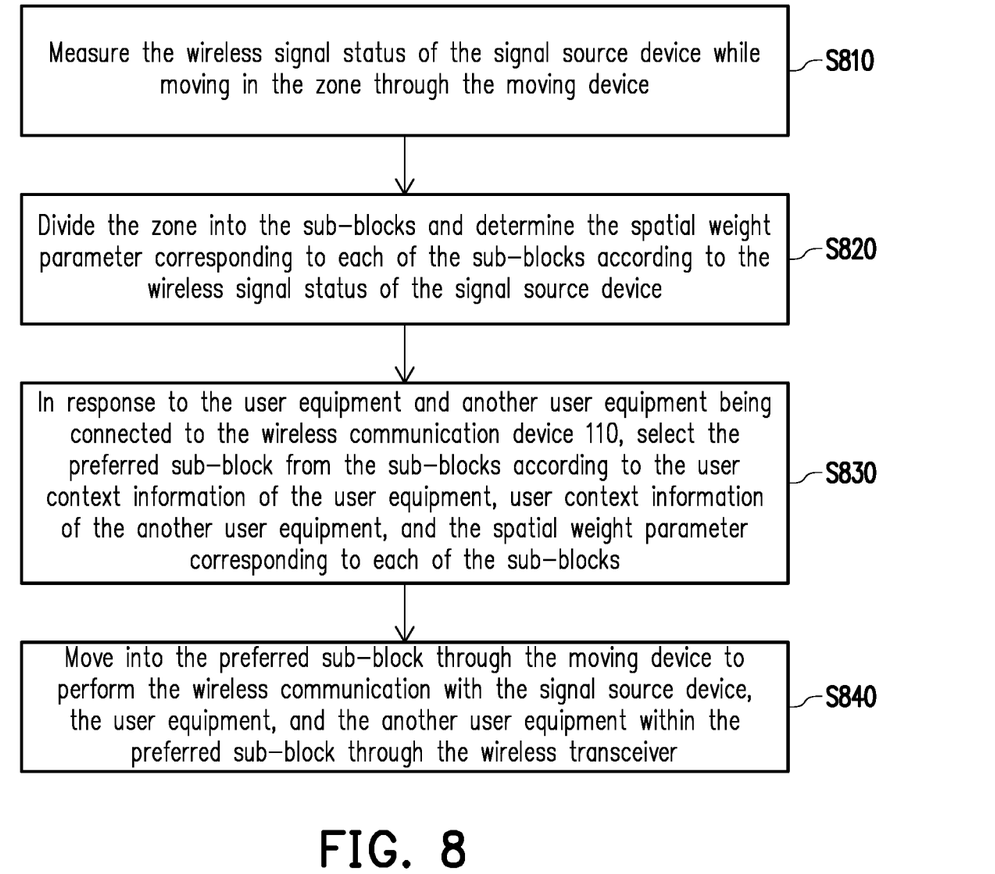
FIG. 8 is a flowchart of a moving method of a wireless communication device according to an embodiment of the disclosure.
Figure 9:
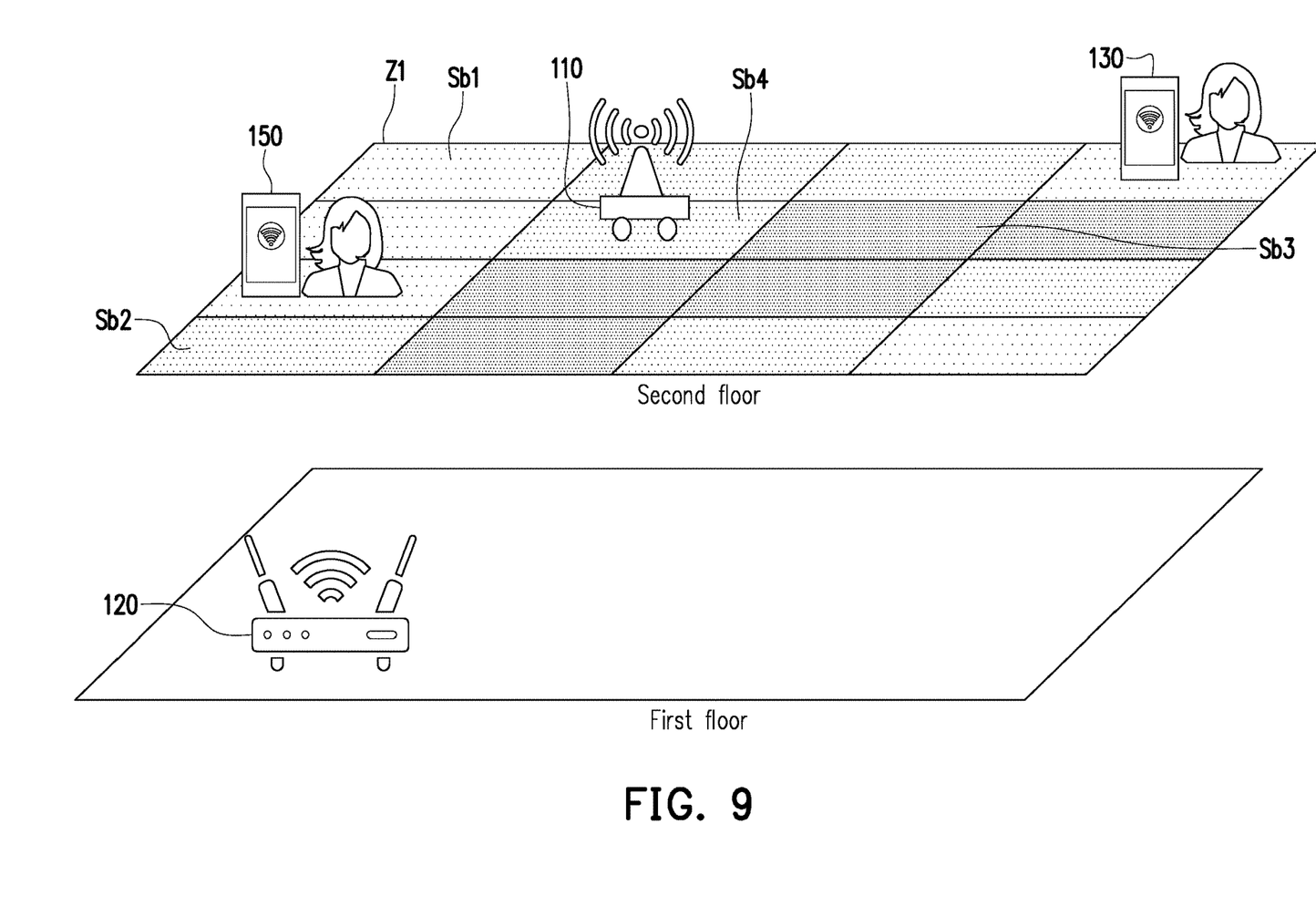
FIG. 9 is a schematic view of a context according to an embodiment of the disclosure.

FIG. 8 is a flowchart of a moving method of a wireless communication device according to an embodiment of the disclosure. A flow process of the method in FIG. 8 may be implemented by the elements of the wireless communication device 110 in FIGS. 1 and 2. In addition, FIG. 9 is a schematic view of a context according to an embodiment of the disclosure. Hereinafter, steps of the moving method in this embodiment will be described with the elements shown in FIGS. 1, 2, and the context in FIG. 9.

In step S810, the processor 113 measures the wireless signal status of the signal source device 120 while moving in the zone Z1 through the moving device 111. In step S820, the processor 113 divides the zone Z1 into the sub-blocks and determines the spatial weight parameter corresponding to each of the sub-blocks according to the wireless signal status of the signal source device 120. Detailed implementations of step S810 to step S820 have been clearly described in the foregoing embodiments, and thus the same details will not be repeated in the following.

It should be noted that in step S830, in response to the user equipment 130 and another user equipment 150 being connected to the wireless communication device 110, the processor 113 selects the preferred sub-block from the sub-blocks according to the user context information of the user equipment 130, user context information of the another user equipment 150, and the spatial weight parameter corresponding to each of the sub-blocks. That is to say, the processor 113 considers the user context information of both the user equipment 130 and the another user equipment 150 to determine the preferred sub-block. More specifically, in addition to obtaining the context weight parameter corresponding to each of the sub-blocks according to the user context information of the user equipment 130, the processor 113 may further obtain another context weight parameter corresponding to each of the sub-blocks according to the user context information of the another user equipment 150. Therefore, the processor 113 may select the preferred sub-block from the sub-blocks according to the context weight parameter, the another context weight parameter, and the spatial weight parameter corresponding to each of the sub-blocks.

As shown in FIG. 9, the wireless signal status of a sub-block Sb4 is worse than the wireless signal status of the sub-block Sb3. That is, the spatial weight parameter of the sub-block Sb4 is less than the spatial weight parameter of the sub-block Sb3. However, under the condition of considering the user context information of both the user equipment 130 and the another user equipment 150, the processor 113 may still select the sub-block Sb4 as the preferred sub-block.

In step S840, the processor 113 moves into the preferred sub-block through the moving device 111 to perform the wireless communication with the signal source device 120, the user equipment 130, and the another user equipment 150 within the preferred sub-block through the wireless transceiver 112. That is, the wireless communication device 110 may provide a wireless relay function to both the user equipment 130 and the another user equipment 150.

It should be noted that a processing procedure of the moving method performed by at least one processor is not limited to the examples of the above embodiments. For example, some of the above steps may be omitted, and the steps may also be performed in other order. Moreover, any two or more of the above steps may be combined, and some of the steps may be modified or deleted. In addition, other steps may be performed in addition to the above steps.

Based on the above, in the embodiments of the disclosure, the wireless communication device as the wireless relay device has the mobility. The wireless communication device continuously measures the wireless signal status of the signal source device during the moving process. The wireless communication device may divide the zone into the sub-blocks and obtain the spatial weight parameter corresponding to each of the sub-blocks according to the scanning measurement result. Therefore, the wireless communication device may select the preferred sub-block according to the user context information of the user equipment and the spatial weight parameter corresponding to each of the sub-blocks, and automatically move to the preferred sub-block to provide the wireless relay function to the user equipment. In this way, the deployment number of wireless access points or wireless relay devices may be reduced, the probability of access point handover by the user equipment may be reduced, and the increase in communication latency may be avoided. In addition, since the preferred sub-block is selected by considering the user context information and the wireless signal status corresponding to each of the sub-blocks, the wireless communication device may provide the good network connection quality that meets the requirements of the user to the user equipment.

What is claimed is:

1. A moving method, adapted for a wireless communication device moving in a zone, comprising:
    while moving in the zone, measuring a wireless signal status of a signal source device;
    dividing the zone into a plurality of sub-blocks and determining a spatial weight parameter corresponding to each of the sub-blocks according to the wireless signal status of the signal source device;
    in response to a user equipment being connected to the wireless communication device for using a wireless relay function, selecting a preferred sub-block from the sub-blocks according to user context information of the user equipment and the spatial weight parameter corresponding to each of the sub-blocks, wherein the wireless communication device is configured to be a wireless relay device between the signal source device and the user equipment; and
    moving into the preferred sub-block, and performing wireless communication with the signal source device and the user equipment by providing the wireless relay function for the user equipment within the preferred sub-block.

2. The moving method according to claim 1, wherein the wireless signal status comprises at least one of signal intensity, a signal-to-noise ratio, and a bit error rate.

3. The moving method according to claim 1, wherein in response to the user equipment being connected to the wireless communication device, selecting the preferred sub-block from the sub-blocks according to the user context information of the user equipment and the spatial weight parameter corresponding to each of the sub-blocks comprises:
    obtaining a context weight parameter corresponding to each of the sub-blocks according to the user context information of the user equipment; and
    selecting the preferred sub-block from the sub-blocks according to the spatial weight parameter and the context weight parameter corresponding to each of the sub-blocks.

4. The moving method according to claim 3, further comprising:
    receiving a user command after moving into the preferred sub-block;
    moving from the preferred sub-block to another preferred sub-block among the sub-blocks according to the user command; and
    updating the context weight parameter of the preferred sub-block and the context weight parameter of the another preferred sub-block according to the user context information of the user equipment.

5. The moving method according to claim 1, further comprising:
    receiving a user command after moving into the preferred sub-block; and
    moving from the preferred sub-block to another preferred sub-block among the sub-blocks according to the user command.

6. The moving method according to claim 1, wherein the user context information comprises a position of the user equipment, an executed application, network traffic, transmission reliability, a minimum dependable flow rate, a maximum attainable flow rate, or a combination thereof.

7. The moving method according to claim 1, wherein in response to the user equipment being connected to the wireless communication device, selecting the preferred sub-block from the sub-blocks according to the user context information of the user equipment and the spatial weight parameter corresponding to each of the sub-blocks comprises:
    locating a user position of the user equipment; and
    selecting the preferred sub-block from the sub-blocks according to the user position of the user equipment, the user context information, and the spatial weight parameter corresponding to each of the sub-blocks.

8. The moving method according to claim 7, wherein selecting the preferred sub-block from the sub-blocks according to the user position of the user equipment, the user context information, and the spatial weight parameter corresponding to each of the sub-blocks comprises:
    determining whether the user position matches a common position;

if the user position matches the common position, selecting the preferred sub-block from the sub-blocks according to the common position; and if the user position does not match the common position, selecting the preferred sub-block from the sub-blocks according to the user context information of the user equipment and the spatial weight parameter corresponding to each of the sub-blocks.

9. The moving method according to claim 1, wherein in response to the user equipment being connected to the wireless communication device, selecting the preferred sub-block from the sub-blocks according to the user context information of the user equipment and the spatial weight parameter corresponding to each of the sub-blocks comprises:

in response to the user equipment and another user equipment being connected to the wireless communication device, selecting the preferred sub-block from the sub-blocks according to the user context information of the user equipment, user context information of the another user equipment, and the spatial weight parameter corresponding to each of the sub-blocks.

10. The moving method according to claim 1, wherein moving into the preferred sub-block to perform the wireless communication with the signal source device and the user equipment within the preferred sub-block comprises:

adjusting an angle of an antenna in the wireless communication device according to the user context information of the user equipment.

11. A wireless communication device, comprising:
a moving device;
a wireless transceiver; and
a processor coupled to the moving device and the wireless transceiver and configured to:
while moving in a zone through the moving device, measure a wireless signal status of a signal source device;
divide the zone into a plurality of sub-blocks and determine a spatial weight parameter corresponding to each of the sub-blocks according to the wireless signal status of the signal source device;
in response to a user equipment being connected to the wireless communication device for using a wireless relay function, select a preferred sub-block from the sub-blocks according to user context information of the user equipment and the spatial weight parameter corresponding to each of the sub-blocks, wherein the wireless communication device is configured to be a wireless relay device between the signal source device and the user equipment; and
move into the preferred sub-block through the moving device to perform wireless communication with the signal source device and the user equipment by providing the wireless relay function for the user equipment within the preferred sub-block through the wireless transceiver.

12. The wireless communication device according to claim 11, wherein the wireless signal status comprises at least one of signal intensity, a signal-to-noise ratio, and a bit error rate.

13. The wireless communication device according to claim 11, wherein the processor is further configured to:
obtain a context weight parameter corresponding to each of the sub-blocks according to the user context information of the user equipment; and select the preferred sub-block from the sub-blocks according to the spatial weight parameter and the context weight parameter corresponding to each of the sub-blocks.

14. The wireless communication device according to claim 13, wherein the processor is further configured to:
receive a user command after moving into the preferred sub-block;
move from the preferred sub-block to another preferred sub-block among the sub-blocks according to the user command; and
update the context weight parameter of the preferred sub-block and the context weight parameter of the another preferred sub-block according to the user context information of the user equipment.

15. The wireless communication device according to claim 11, wherein the processor is further configured to:
receive a user command after moving into the preferred sub-block; and
move from the preferred sub-block to another preferred sub-block among the sub-blocks according to the user command.

16. The wireless communication device according to claim 11, wherein the user context information comprises an application executed by the user equipment, network traffic, transmission reliability, a minimum dependable flow rate, a maximum attainable flow rate, or a combination thereof.

17. The wireless communication device according to claim 11, further comprising a positioning device, wherein the processor is further configured to:
locate a user position of the user equipment through the positioning device; and
select the preferred sub-block from the sub-blocks according to the user position of the user equipment, the user context information, and the spatial weight parameter corresponding to each of the sub-blocks.

18. The wireless communication device according to claim 17, wherein the processor is further configured to:
determine whether the user position matches a common position;
if the user position matches the common position, select the preferred sub-block from the sub-blocks according to the common position; and
if the user position does not match the common position, select the preferred sub-block from the sub-blocks according to the user context information of the user equipment and the spatial weight parameter corresponding to each of the sub-blocks.

19. The wireless communication device according to claim 11, wherein the processor is further configured to:
in response to the user equipment and another user equipment being connected to the wireless communication device, select the preferred sub-block from the sub-blocks according to the user context information of the user equipment, user context information of the another user equipment, and the spatial weight parameter corresponding to each of the sub-blocks.

20. The wireless communication device according to claim 11, further comprising an antenna, wherein the processor is further configured to:
drive and adjust an angle of the antenna according to the user context information of the user equipment.

* * * * *